(12) United States Patent
Willen et al.

(10) Patent No.: US 7,058,949 B1
(45) Date of Patent: Jun. 6, 2006

(54) OPERATING SYSTEM SCHEDULER/DISPATCHER WITH RANDOMIZED RESOURCE ALLOCATION AND USER MANIPULABLE WEIGHTINGS

(75) Inventors: James W. Willen, Shoreview, MN (US); James F. Merten, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 809 days.

(21) Appl. No.: 10/038,547

(22) Filed: Oct. 19, 2001

Related U.S. Application Data (60) Provisional application No. 60/246,767, filed on Nov. 8, 2000.

(51) Int. Cl.
*G06F 9/46* (2006.01)

(52) U.S. Cl. .................. 718/104; 718/102; 718/103
(58) Field of Classification Search ......... 718/102–104
See application file for complete search history.

(56) References Cited

U.S. PATENT DOCUMENTS 5,569,084 A * 10/1996 Nicastro et al. ............... 463/20

OTHER PUBLICATIONS

Liana L. Fong and Mark S. Squillante, Time- Function Scheduling: A General Approach To Controllable Resource Management, IBM Research Division T.J. Watson Research Center, Mar. 1995.*

* cited by examiner

*Primary Examiner*—Meng-Al T. An
*Assistant Examiner*—Camquy Truong
(74) *Attorney, Agent, or Firm*—Beth L. McMahon; Charles A. Johnson; Mark T. Starr (57) ABSTRACT

This invention provides to large-scale operating systems supporting multiple classes of tasks a method to allocate processor resources to the classes according to a probability model. It is useful in preventing a class from being denied resources by giving it positive measure in the model. A first stage probability algorithm assigns classes of tasks to an IP resource available to a given scheduler queue. Each class is allocated a probability level in a lottery-type draw in this first stage. In preferred embodiments, a second stage probability algorithm is used to assign tasks within a class to an available processor resource. This second stage algorithm is biased in a feedback manner by task resource usage history. Tasks of extreme high or low priority may avoid the probabilistic mechanisms in preferred embodiments.

21 Claims, 5 Drawing Sheets

OPERATING SYSTEM SCHEDULER/DISPATCHER WITH RANDOMIZED RESOURCE ALLOCATION AND USER MANIPULABLE WEIGHTINGS

RELATED APPLICATIONS

The disclosure in this document is based on the Provisional Application Filed on Nov. 8, 2000, Ser. No. 60/246,767.

BACKGROUND OF THE INVENTION

1. Field of the Invention

This invention relates generally to multiple process dispatchers, also called schedulers, that are used by operating systems to allocate computer resources to processes, and particularly to such dispatchers or schedulers which employ some degree of randomness in selecting which process gets allocation of a resource as it becomes available, and most particularly to computer system instruction processor resources.

2. General Background

In large scale computer systems, especially ones which do transaction processing for many users, allocation of instruction processor time to various users and classes of users becomes problematic, especially where the operating system allows for classification of users (or the processes/software agents they are running) into priority groups. In such cases, if there is a fair amount of activity by relatively high priority user groups, the low priority groups may never, or at least not with sufficient probability, get the use of the instruction processor resource. Tasks that must be done but do not warrant high priority usage group classification, such as batch clean-up tasks, for example, may not get executed at all, thus ultimately impairing the value of the computer system to the business concern which has the batch tasks attempting to run with the transaction processing tasks.

In an article titled "Lottery Scheduling: Flexible Proportional-Share Resource Management" (Proceedings of the First Symposium on Operating Systems Design and Implementation, 1994, PP 1–11; incorporated herein by reference, the authors described a method for lottery scheduling which could be applied to this problem. However by itself it is insufficient to run a scheduler in any large scale computer system. A public critique of the article was given by Michael Courage on Feb. 22, 1996 at http://www.eecs.harvard.edu/~courage/cs261/critique (also incorporated by this reference).

A problem we encountered was that the requirement to recalculate the allocation scheme constantly was unacceptable in a computer system doing an average of four thousand scheduling allocations in each second.

In the applicant's computer systems, multiprocessor computer systems are common, and the use of the scheduler described in this application may be better understood in the context of such systems, although it is not a requirement for understanding the functioning of the invention herein. Because the multiprocessor systems may have numerous task queues, the scheduler executable which does the allocation may be activated for each one of these queues. Reference may be had to the inventor's patent application Ser. No. 09/920,023, filed Aug. 1, 2001, hereby incorporated by this reference in its entirety, in which the invention herein can be used to function in the capacity of the dispatcher or dispatcher program which schedules or allocates the tasks on the various switching queues for the various instruction processors. Of course, even single processor systems and systems with single task queues may benefit from the inventive features described in the instant patent.

Accordingly, there is a need to develop a more efficacious scheduler for large-scale computer systems. This is especially true for computer systems that handle many users doing transaction processing and that are also handling other tasks at the same general time.

SUMMARY OF THE INVENTION

The invention uses a random number generator to allocate instruction processors' time in accord with a scheduling algorithm. In a multiprocessor system there may be many processors, of course, and the scheduling algorithm can be used for all of them in groups or singly, as may be desirable in a given computer system. The implementation of the invention preferably will allow for certain critical and/or very high priority processes to be granted time for processing without waiting to be selected from a queue of waiting processes, and the inventive algorithmic features are applied to all other requests from all other processes for instruction processor time. Each process or task will be assigned, or otherwise be given an assigned amount of processor time. (An amount of processor time is called a "quantum", that is, a fixed time period during which a task may use a processor resource).

Assignment will occur through a two-stage lottery process. In the first stage, a user-definable set of classes will be chosen based on a user-selectable probability assigned to each of the user-definable classes. In the second stage, selection among tasks within a class is made. In this second class, the amount of a quantum a task may have is also determined. Through use, this amount of time allocated will be expanded or reduced based on how much of the allocated time was used by the task during its last execution. In the first stage lottery, tokens or other ways of assigning likelihood will be allocated among the classes, such that 100 percent (100%) of the allocable probability is distributed amongst the existing classes. When the random number generation is selected it indicates one of the classes. Workarounds for failure of a winning class to have an activity are also specified.

In the second stage lottery, an amount of time (portion of a quantum in our preferred embodiments) is allotted to each task within a class. The class that won the first lottery (assuming it has more than one task to run on the resource now available to it) has this second stage lottery applied to all but preferably the most time critical or most high priority tasks within that class. For all other levels of priority tasks that compete to win the second stage lottery within the class, the highest priority ones among them have more tokens (like slots in a roulette wheel) which mean an increased likelihood of obtaining instruction processor time for a higher versus lower one of these levels. Unlike the first stage lottery, the second stage lottery requires a reduced amount of time for a task in a higher priority level and an increased amount of time available to lower priority level tasks. Tasks can move among the levels within a class based on a non-computationally intense understanding of how much of the time available to such a task was or was not used.

A class is also available to tasks of such low priority that they only run (i.e., get instruction processor time) if there are no tasks waiting for the first stage lottery or no high priority non-lottery tasks. In preferred embodiments, this class comprises low-level bookkeeping and statistical information gathering tasks the Operating System (OS) may want to do.

As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

Figure 1:
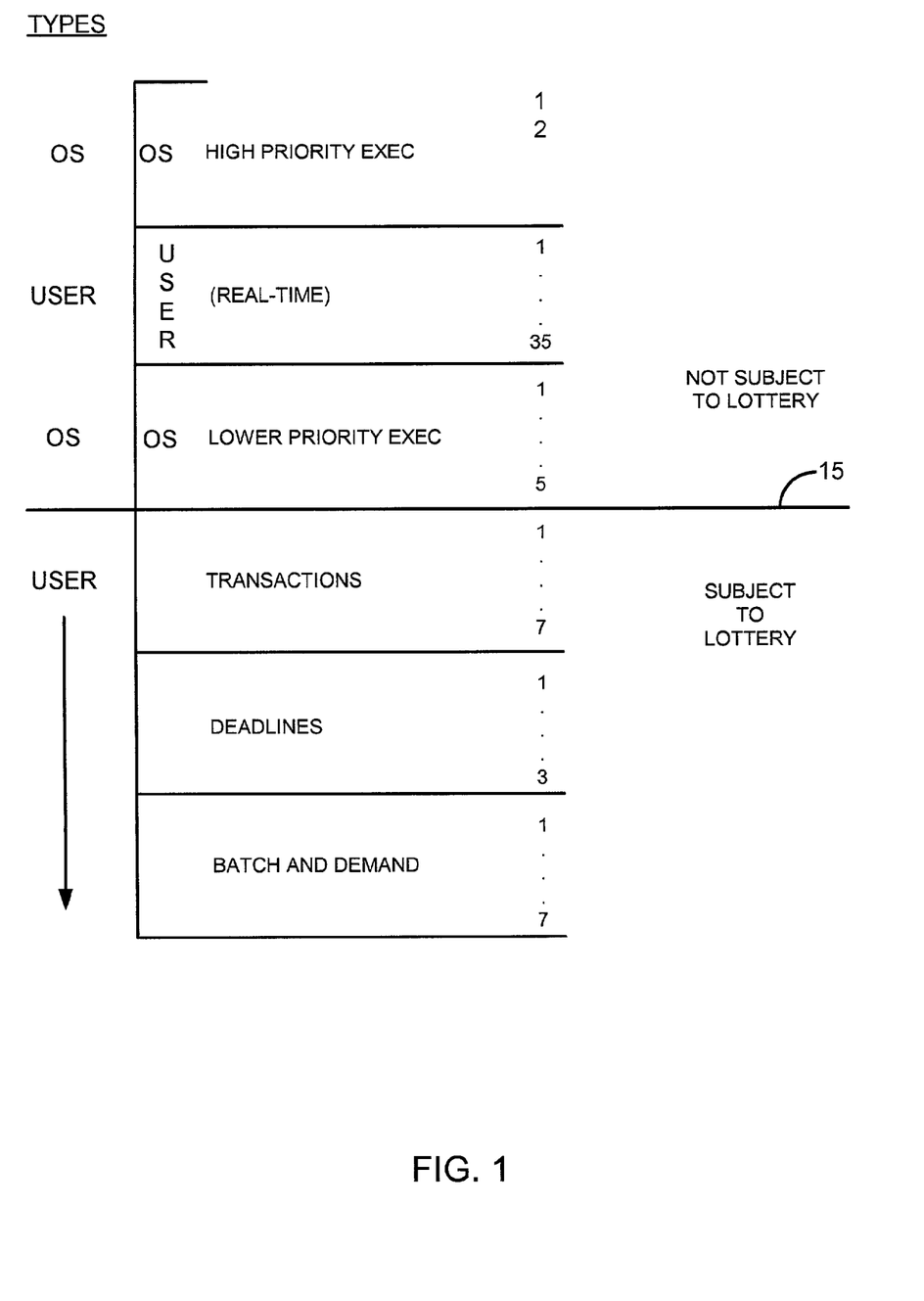
FIG. 1 is a chart showing process types that may be subject to lottery allocation and which may not be according to a preferred embodiment of the present invention.

In FIG. 1, there are illustrated various types of tasks which are of high enough priority that they will be given instruction processor time at a very high priority basis in the scheduler queue, above line 15, and below line 15 are various types of tasks which are not of sufficient priority to escape the application of the lottery form of allocation of processor time described in detail herein. (For extremely low priority tasks, our preferred embodiment also has a sub-lottery system which we discuss later that operates when the lottery fails to find a task).

Specifically, there are three types or classes of tasks which are given above-the-line priority. A user may specify a different number, or allocate different numbers of levels of tasks to each of the classes as may be desirable given a particular operating environment. However, it should most often follow that OS tasks which are of high priority outrank in importance any real-time tasks (such as communication tasks), and that there will be lower level OS tasks as well. For example a user could specify that there be only two levels of High Priority Exec (OS) tasks and that some particular application program be given a class below the real-time class of FIG. 1, but above the low level Exec (OS) tasks, thus requiring four classes, and the particular application program class may itself be divided into 3 levels. We only touch on these above-the-line classes briefly since we believe the inventive features are in the overall organization of the system and the lottery system itself. However, we felt it important to explain the overall system and to do so requires some explanation of the functioning of each part. In the most preferred current embodiment, first are the highest priority operating system tasks (called "Exec" tasks in Unisys Corporation 2200 computer systems). There are preferably two levels within this class and these levels may usurp time from lower levels if desired. The drawing illustrates seven levels (1–7), indicating only that there should be some user-addressable flexibility in selecting a number of levels. The User Real Time Tasks (of which in the 2200 operating system there are up to thirty-five levels) get the next priority in resource allocation for the dispatcher for above-the-lottery-line tasks. There are also lower priority operating system tasks which also execute prior to the lottery system tasks; in our preferred embodiment there is a default of five of these levels. Clearly, one of ordinary skill in these arts will understand that various allocations of above-the-line resources may be made within the scope of this invention and that this is just the preferred embodiment allocation. For other alternative examples, there may be no lower level operating system task class, or each of the class categories may contain different numbers of levels, or there may even be only one class "above-the-line" if desired.

Below the lottery line 15 are the task classes subject to the lottery. In the preferred embodiment there are three default classes and the user may direct that there be more, or less. We describe the default embodiment, but it is to be understood that the user of these systems (a system administrator or owner of the computer system for example) can define its own classes and number of levels within each such class. The three classes are Transaction, Deadline, and Batch/Demand. In an alternate embodiment the Batch/Demand class may be divided into separate Batch and Demand classes. The lottery is a two stage algorithm wherein the first stage selects from which class a task will be chosen and in the second stage, the level of the task within that class will be chosen. A chain of tasks within a same level will typically be organized and assigned on a First-In-First-Out manner, but there may be variation as desired in this ordering of the tasks on a level; First-In-Last-Out, or another layer of prioritization could be such possible alternatives. The tasks within each of these three classes in the preferred embodiment we are describing now preferably all stem from User generated activities. As just mentioned, these classes have levels also within each class. In the default condition, seven levels exist for the Transaction class, three for the Deadline class and the Batch/Demand class also has seven levels. The highest of the levels in each class in the 2200 implementation is for I/O tasks which historically have been short in duration for assignment to execute and then waited a long time to complete without requiring any IP resources. We shall discuss this in more detail later, but for now it is sufficient to explain that in the 2200 operating system preferred embodiments, the first level in each class acts like an interrupt for that class, and if any tasks are in that level they execute first, without regard to which level may be picked in the second stage lottery. In fact, the second stage lottery need not be run until after all first level tasks are completed within a class that is chosen after or from the first stage lottery.

Figure 2:
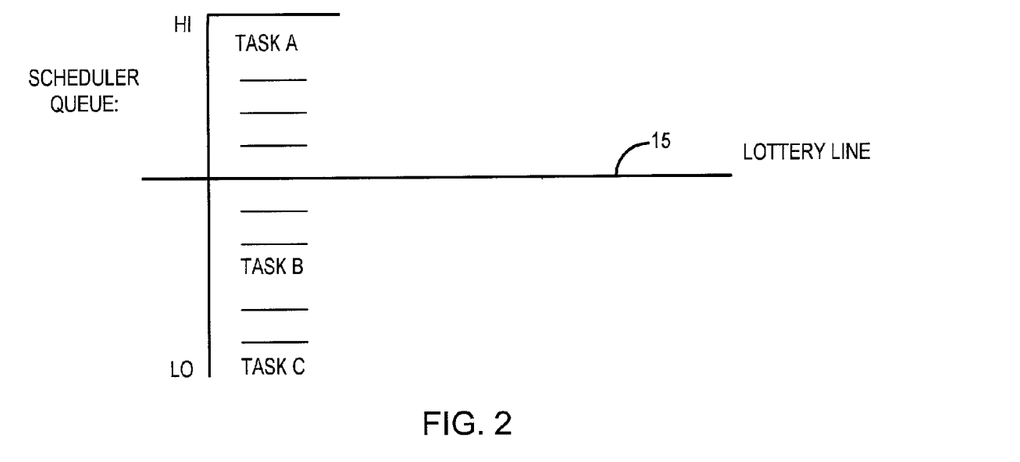
FIG. 2 is a chart of a scheduler queue.

Thus, FIG. 1 describes the allocation of tasks to the scheduler queue, set out in FIG. 2.

In FIG. 2, a scheduler queue is illustrated, having three tasks Task A, Task B, and Task C. The scheduler queue is the list of tasks the scheduler code works with to determine which tasks to run on an available instruction processor (IP) resource. The tasks from above line 15 (the Lottery Line) will be handled first; thus here Task A will be assigned first to the available instruction processor. After Task A is handled and completed and assuming there are no other above-the-line tasks to handle, and that this scheduler still has IP resource available, the scheduler processes we describe herein will allocate the next available instruction processor time to either Task B or Task C in accord with our inventive lottery scheme. The tasks below the Lottery Line in FIG. 2 are actually organized in a manner more accurately described with reference to the drawing of FIG. 3, in that references to them operate in a circular rather than linear manner.

A processor or IP resource is allocated by a time measure we call a quantum, which is the time a timer runs before a task that is assigned to that resource is suspended. Thus, if Task A is assigned to an IP resource for one quantum, it will run until that quantum is over or the task is completed, whichever occurs first. If Task A has not completed it will go back to the scheduler queue for reassignment when the scheduler is next again assigning tasks to IP resources.

Figure 3:
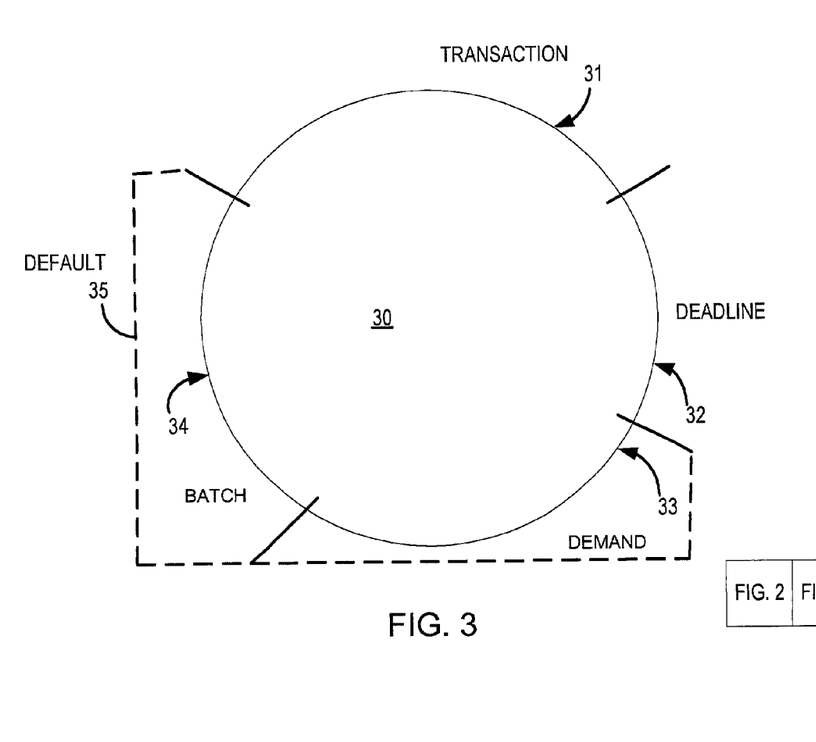
FIG. 3 is a lottery queue wheel illustrating one allocation configuration for group selection bias in accord with a preferred embodiment.

In FIG. 3 a lottery circle 30 which represents all possible outcomes of the first stage lottery is divided into four segments; Transactions 31, Batch 34, Demand 33 and Deadline 32. (In the default embodiment we use three classes and divide the circle into three areas, Batch and Demand 35, Transaction 31, and Deadline 32 task classes). Thus the tasks of each kind are given larger or smaller segments of the circle, depending on how the user thinks their priority should be allocated. In the preferred embodiment, the user will allocate segment size by assigning a percentage of 100 percent (100%) to each of the classes so that the total assigned will be 100 percent (100%) of the circle. Comparing this to a roulette wheel if there are 100 slots on the wheel and Transaction class gets 100 percent (100%), every run of the random number generator would point to a Transaction class task assignment. If it were 30 percent (30%) Transaction, 30 percent (30%) Batch and Demand (as one class) and 40 percent (40%) Deadline, Deadline should win more than one-third of the time. To make it fair, given the proclivities of typical random number generators, we divide the possibilities into 512 slots (and a 30 percent (30%) chunk of those would be 154 with rounding), thus Transaction would be assigned 154 slots randomly among the 512, Batch and Demand would get a different randomly selected 154 slots and Deadline would get the remaining 204 randomly selected slots. Thus slot 0 might be a Deadline slot, slot 1 might be a Batch and Demand slot, and slot 2 might also be a Batch and Demand slot, and so on, depending on the random identification of slots to classes. The selection of a slot therefore selects which class descriptor table (a conventional term for the data file holding all pointer information for tasks needing resources within the jurisdiction of a scheduler queue) gets the available IP resource but the task within the class descriptor table that is chosen is selected based on the second stage lottery. Thus, in the preferred embodiment, there are three distinct entries in a 512 word table, randomly distributed in accord with chosen percentages selected by the user.

In FIG. 3, note that Deadline tasks are the smallest segment indicating that the user's tolerance for delay in processing them is great in the context of that user's data processing work environment. Automatic allocation occurs if the user does not select the percentages for the classes. If the user uses the suggested three default classes, and does not reorganize them, the preferred default percentages conform to the order of priority: Transactions, Deadlines, then Batch and Demand tasks.

There are various ways one of ordinary skill in this art can implement a lottery to handle the requirements of this embodiment and all such that can be readily adapted to this task are acceptable for use. To repeat, the particular scheme we chose is to use a table of 512 slots (or a word table with 512 entries), into which we assign the three (or however many are chosen by the user) classes. We randomly distribute the selected number of pointers for each class (i.e., for three classes, there are three distinct entries) to class descriptor tables for each of the three classes among the 512 slots. A random number is generated between 0 and 511, inclusive, and the closest of the 512 slots to the random number is assigned to be the winner. This may, for example, be the Transactions class descriptor table pointer, which could have been distributed to box 321 of the 512 boxes in the table. The Transactions class then would have its class descriptor table reviewed to see if there are any tasks of the Transaction class to run. If not, we move on to the Deadline class group descriptor table instead of going back to the lottery in order to save time and processor resource. If none are in the Deadline category, we move to the Batch & Demand class and check its group descriptor table. If no tasks are available, then the scheduler moves on to a sub-lottery tasks, which are described later. One of ordinary skill will see that it is apparent how to modify this scheme to accommodate more or less than three classes.

Once the class is chosen, if there are more than one task at more than one level of tasks within that class to choose from, typically this invention then invokes a second stage lottery to do this within class level-picking. It should be understood that the highest level within a class, in the preferred embodiment, is chosen for tasks that require quick execution but not a lot of processor time. Accordingly they are prioritized similarly to an interrupt-level selection criteria wherein when there is a task in that level within a class descriptor of a class, that level one task gets done before any others within the class. All the other levels within a class get to be assigned through the second stage lottery. Some users may prefer not to use the first level so some embodiments may not employ it for some or all of the lottery-affected classes.

The second stage lottery allows for movement (i.e., reassignment) of the tasks among the levels within a class. This is done, in our preferred embodiment, based on how much of the time allotted (i.e., the IP resource) was last used. To accomplish this bias we set up the levels to give higher priority access to an IP resource to tasks that use less time within that class. Specifically, if a task uses less than half the allotted time given it for the resource allocation before giving up the IP resource, that task gets pushed up to a higher level. If it uses close to the amount of time given, it stays within the same level. If the task uses all the available time and still needs more, it gets put onto a lower priority level, and is assigned a larger quantum of the resource. This reassignment algorithm requires very little compute time to implement. It can be varied considerably with some useful effect as well. For example, in one preferred embodiment we use the following criteria for level adjustment and timing adjustment for a task. If less than $\frac{1}{32}$ of the allocated time used, decrease the time available to that task by $\frac{1}{2}$ and move it to next highest priority level within class (if there is a higher one) but if up to $\frac{31}{32}$ of allocated time used, do not move or change allocation of time for this task, but if the task is still executing when its resource time expired, double its IP resource time allocation and drop it to next lower level. A slight variation on that would be to move a task that uses less than $\frac{1}{32}$ of its allocated time immediately to the highest level and cut its available time to the lowest amount (a single tick in our preferred embodiment). Tasks could also in this variation for example, move up one level for use of more than $\frac{1}{32}$ but less than $\frac{1}{2}$ of their allotted time. And keep the same amount of time as their allocation for the next time they execute. Numerous variations of this algorithm are clearly available within the scope of this disclosure.

In our preferred system, we use a "quantum" divisible into 32 parts (or "ticks") to determine the amount of time (i.e., the IP resource) that each task gets. At the end of each quantum, determined by a quantum timer, an interrupt will suspend whatever task is running on the IP resource and return the IP resource back to the scheduler for that IP resource for a next task assignment. The quantum amount given to a task is initially determined by some interaction between the user program and the operating system. How this allocation of quantum amount is accomplished is not relevant to this discussion except that in the second stage lottery this initial amount can be preferably used to assign a priority level to the task. Other ways can be used in alternate embodiments, but we find it simpler and less difficult to implement to have an inverse correlation between the priority level for a task within a class and the size of that task's time allocation. If we change the bias toward choosing a task by halving or doubling the part of the quantum available to a task from one level to the next, there are only six levels between one tick and one quantum. Thus, as an alternative embodiment, we can have the highest level and the next level within the class both be one tick long and have seven levels all within one quantum, or we can have multi-quantum tasks get interrupted on the seventh or lower levels before they can complete. Likewise, as another alternative, one could divide the quantum into 64 ticks or 128 ticks and increase the number of levels in a class, and still be in keeping with the ideas presented herein.

Thus, the lottery system for the second stage has a user or default number of levels to choose from, in the preferred embodiment with the first (highest priority) level being chosen outside of the lottery. In the most preferred embodiment the chance of being chosen increases in inverse correlation to the time allotted to a task as described. Therefore, with a quantum being the maximum assignable time unit on an IP resource, and there being up to 32 ticks per quantum, for a 7 level class, the probability distribution would thus be: 100 percent (100%) for class 1 (outside the lottery), 32 out of 63 for class 2, 16 out of 63 for class 3, 8 out of 63 chances for tasks in class 4, 4 of 63 chances for selection for tasks in class 5, 2 chances of 63 for class 6 and 1 of 63 chances for class 7. One can allocate the probabilities differently if desired. However, with this simple formula, and also using the same movement to a next level within the hierarchy if the lottery does not point to a level with a task until a task is found that we used to find classes with tasks in the first stage lottery, we have found that in all cases there is no failure to allocate some time to all tasks.

In generating a software structure for this second stage lottery using our most preferred example embodiment with 7 levels and 32 ticks, the simplest analog would be a roulette wheel with 63 slots, 32 allocated to the second level, 16 to the next, 8 for the next, and so on, and preferably the distribution of the slots for each level would be random, rather than bunched together to accommodate imperfections in the random number generator routines.

More of the conceptual framework is described with reference to FIG. 4, flow diagram 40, in which the process steps of the preferred embodiment are outlined. The scheduler when activated 41 has an IP resource ready to assign to a task for which it is responsible. Refer to FIGS. 5A and 5B for explanation of which IP resources are covered by which scheduler queues. The first thing the scheduler has to do is determine whether it has any above-the-lottery-line tasks, which it does in step 42. If there is one it assigns 43 it to the IP resource, and if more than one, it starts with the highest priority tasks and then assigns tasks of lower priority within the above-the-line range.

If it does not have an above-the-line-task waiting to be assigned to an IP resource, the scheduler runs 44 the first stage lottery algorithm. Here it determines which of the classes (in the default embodiment there are three) will get its highest priority task assigned. It will then go to the table maintained by that class to see 45 if there are any tasks within that class to be assigned. If not, it will serially go through 48 the next level class, and the next until all the class task tables are checked. Thus, in the default case, if the Deadline class won the first stage lottery, and there were no Deadline tasks, the scheduler queue would then poll the table of the Batch and Demand class for tasks waiting to be assigned, and if it found none there, it would move on to the Transaction class. If none were found 49 there, in the three class default embodiment, the scheduler would then assign 62 an idle task or SIP (software instrumentation package) task to the IP resource to execute. The idle or SIP task continues to run until either a processor interrupt occurs or another component of the operating system signals that a task is now available to execute and then the IP resource is returned to the scheduler to assign 41 a next task. If there is an interrupt, at any time, it is handled 64 with the normal interrupt handling routines of the system and then the IP resource is returned to the scheduler for assignment 41 to a next task.

Figure 4:
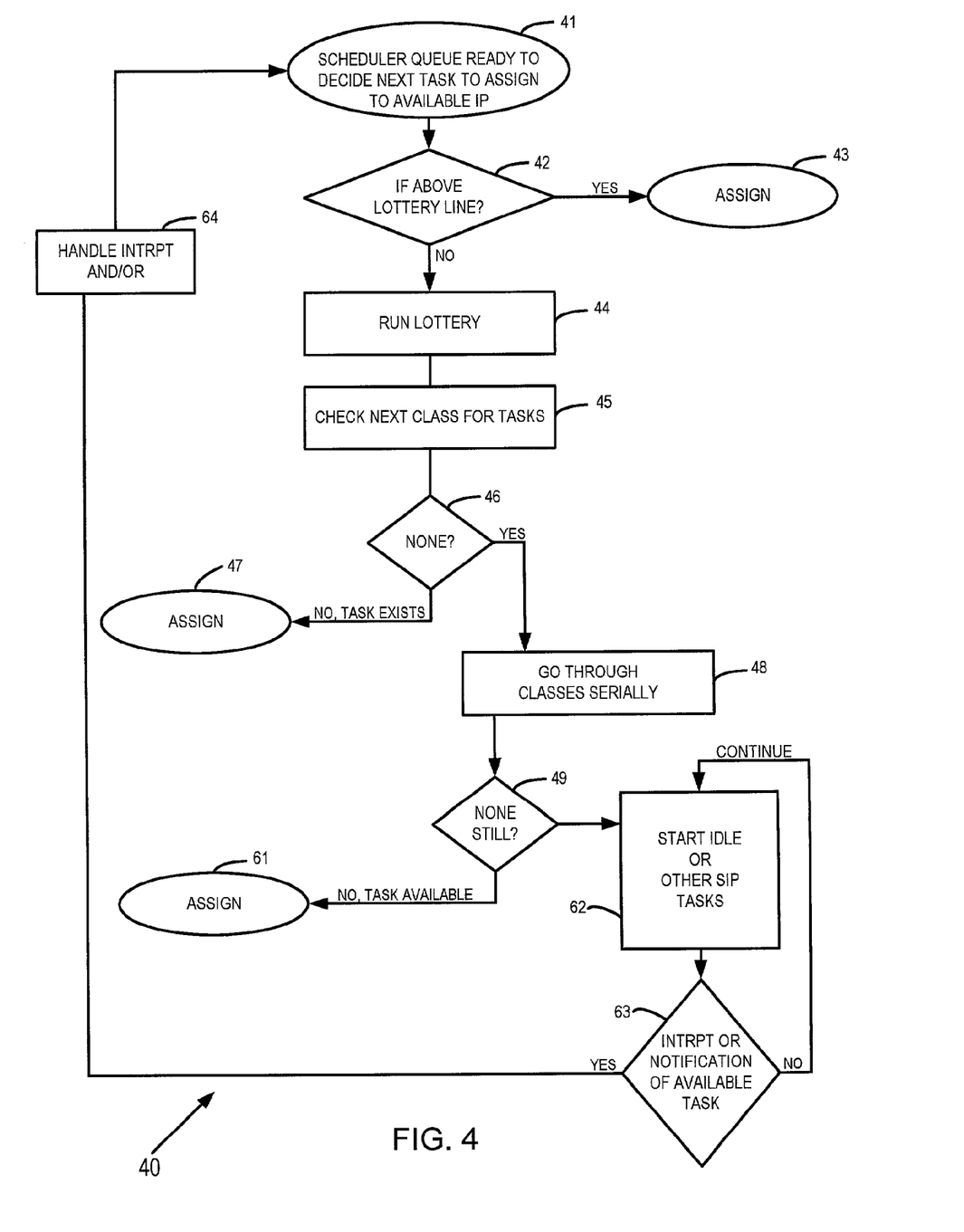
FIG. 4 is a flow chart in accord with a preferred embodiment illustrating the process flow of the invention.
Figure 5A:
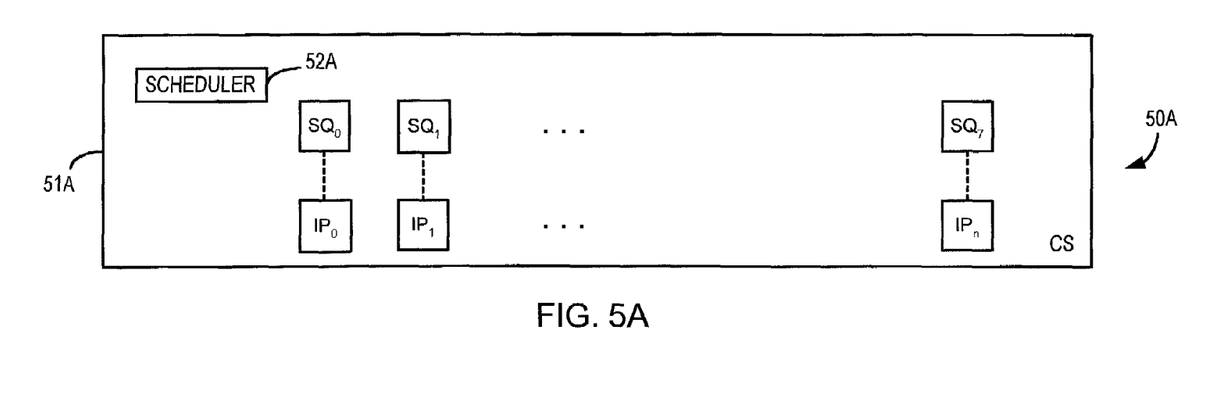
FIGS. 5A and 5B are heuristic block diagrams illustrating components of multiprocessor computer systems that would be used by preferred embodiments of the invention.
Figure 5B:
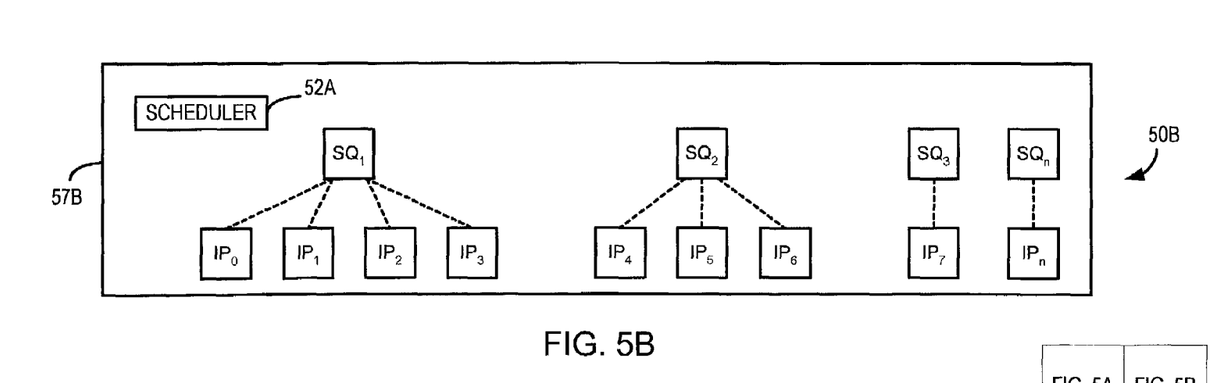
Figure 6:
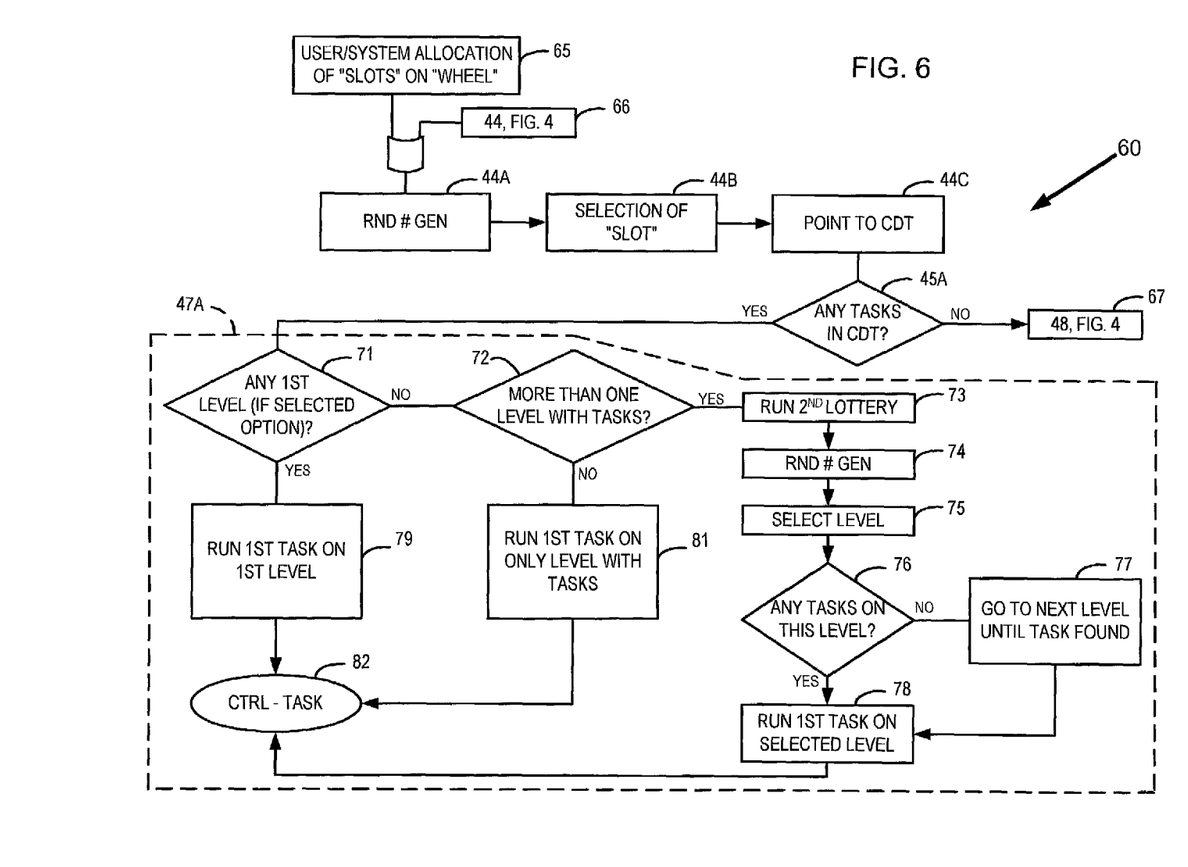
FIG. 6 is a flow chart in accord with a preferred embodiment of the invention, illustrating some particulars of a second stage lottery.

The flow chart 60 of FIG. 6 should be read with the flow chart 40 of FIG. 4 for a more complete understanding of the process and system of the invention. The system expects either a user allocation or default allocation of slots on the first stage lottery wheel, that is selection of percentages for each class as described above. ("Slots" and "Wheels" are mere intuitive constructs to simplify the explanation. A programmer of ordinary skill will be able without undue experimentation to create software structures which function logically in the manner of slots in a roulette wheel based on the description herein, and these structures will have no physical resemblance to these terms). Thus when step 44 of FIG. 4 runs the first stage lottery, it generates 44A a random number, selects 44B from the list of classes based on the allocation of percentage of slots compared to the generated random number and uses 44C the pointer at the chosen slot to a Class Descriptor Table (CDT) to be able to answer the question 45A of whether there are any tasks within the selected CDT.

The explanation related to FIG. 4 starting at step 48 therein adequately describes what happens 67 if there are no tasks in a chosen CDT.

If there are tasks within a CDT chosen in the first stage lottery, FIG. 4 indicates merely that the second stage lottery should be run to determine which task should be assigned to the available resource. Thus in dotted line 47A, FIG. 6 outlines 11 articles of action and query which comprise the second stage lottery function. First the determination 71 should be made (if this class has an above-the-second-stage-lottery line task level) of whether there are any above-the-second-stage-lottery line tasks in this class. If there are then the first task on the task chain for that above-the-second-stage-lottery line level should be assigned control 82 for whatever period of the quantum is indicated for that task. If there are no above-the-second-stage-lottery line levels in this class, then the process would start with the query step 72, determining whether there is more than one level with tasks in it to do. One could skip this step in less preferred embodiments and go directly to step 73, but lottery running requires not insignificant compute time so we prefer to make this determination 72 first. Assuming then that we are running step 72, the first task on the only level with any tasks is selected and control of the available quantum portion is given 82 to that task.

Next we run 73 the second stage lottery. This requires the running of the random number generator 74, the selection of a level based on matching the number to the level selected, and a pointer at that level to the first task in the chain for that level. Of course, if 76 there are no tasks on that selected level, we can go the next level in the hierarchy of levels until we find a task (which in the preferred embodiment we found from step 72), and then we run the first task on that level 78, giving control 82 of the processor resource for the appropriate portion of the quantum to that task.

Highly simplified conceptual models of computer systems are illustrated in diagrams 50A and 50B of FIGS. 5A and 5B, respectively. These figures provide a simplified explanation of relevant information from the patent application Ser. No. 09/920,023 referenced previously and are used to describe how the invention relates to such systems. Inside computer system 51A there is a scheduler program, usually a piece of re-entrant code, an instance of which runs each of the scheduler queues (SQ0–SQ7) to accomplish the tasks described above for the scheduler queues. In computer system 51A, there is a single scheduler queue to each instruction processor. In computer system 51B, again all the scheduler queues run the scheduler 52A, but here there are asymmetries between the number of scheduler queues and the instruction processors. The invention will work with all these systems, and also with systems having only a single scheduler queue for all instruction processors or for a single instruction processor computer.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

The invention claimed is:

1. A two-stage lottery program for a dispatcher program that dispatches tasks within an operating system of a computer system, the computer system supporting at least two classes of said tasks, each of said classes including at least two levels of said tasks, said dispatcher program to determine which of said tasks will be assigned to a next available instruction processor resource, said two-stage lottery program comprising:

a random number generator and selection program for generating in a first lottery stage a first random number for selecting one of said at least two classes, and for generating in a second lottery stage a second random number for selecting one of said at least two levels within said selected class; and a transfer program for assigning said next available instruction processor resource to execute a task assigned to said selected one of said at least two levels.

2. The two-stage lottery program of claim 1 further comprising:

a level switching routine to handle a failure by said transfer program to find a task on said selected one of said at least two levels and to assign said next available instruction processor resource to a task associated with a different one of said at least two levels.

3. The two-stage lottery program of claim 1 wherein any one of said at least two levels is two times more likely to be selected than a next lower one of said at least two levels.

4. The two-stage lottery program of claim 3 wherein tasks within each level of said at least two levels will be assigned to said next available instruction processor resource for a same amount of time as other tasks in said level.

5. The two-stage lottery program of claim 1 wherein each of said tasks is respectively associated with an amount of time said each of said tasks may continuously execute on said next available instruction processor resource, and wherein said two-stage lottery program employs a quantum bias routine comprising:

a data capture routine for determining how much of said associated amount of time said task executes on said next available instruction processor resource before returning control to said dispatcher; and a bias adjustment routine for adjusting said amount of time associated with said task based on how long said task last executed on said next available instruction processor resource.

6. The two-stage lottery program of claim 5 wherein said bias adjustment routine does not adjust said amount of time associated with said task if execution of said task was interrupted by an interrupt.

7. A computer system having a quantum timer to allow an instruction processor resource to be assigned to process one or more tasks, the computer system also having a dispatcher program whereby all of said one or more tasks are identified as being members of classes, said dispatcher program comprising:

a) a scheduler to determine for how long, and to which of said one or more tasks, said instruction processor resource will be next assigned; and b) a scheduler queue from which said one or more tasks may be assigned to said instruction processor resource, wherein said scheduler provides a two stage lottery, a first stage using a lottery process to select one of said classes and a second stage using a second lottery process to select from said selected class a level, wherein said scheduler selects a task that will next be assigned to said instruction processor resource from said one or more tasks that are members of said selected level of said selected class.

8. The computer system set forth in claim 7 wherein said first stage chooses a class randomly from among all said classes using a bias settable by a user.

9. The computer system set forth in claim 7 wherein the number of said classes is selectable by a user.

10. The computer system as set forth in claim 7, wherein any of said one or more tasks included within one or more predetermined classes are assigned said instruction processor resource prior to said scheduler providing said two stage lottery.

11. The computer system as set forth in claim 7, wherein if the scheduler selects one of said classes that does not have any of said one or more tasks as members, said scheduler chooses another one of said classes.

12. The computer system as set forth in claim 7, wherein if none of the classes has any of said one or more tasks as members, said scheduler selects a low priority level operating system task.

13. The computer system as set forth in claim 7, wherein said second stage lottery comprises:

a random number generator and selection program for generating a random number and for selecting said selected level within said selected class based upon said random number; and a transfer program for causing said instruction processor resource to begin execution of one of said one or more tasks that is assigned to said selected level.

14. A method for use by a dispatcher of a computer system for selecting one of multiple tasks to provide with an available instruction processor resource, wherein said one of said multiple tasks may be selected from one or more classes, each of which may have one or more priority levels, wherein said method comprises:

determining whether there are any of said multiple tasks within said priority levels of said classes that are above a second stage lottery line, and if so assigning a first of said multiple tasks to said available instruction processor resource; but if not, and if there is only one said priority level having any of said multiple tasks, assigning a first of said any multiple tasks from said only one priority level to said available instruction processor resource; else, running a first stage of a two-stage lottery algorithm to select one of said one or more classes, running a second stage of said two-stage lottery algorithm to select a priority level from said selected class, and selecting said selected one of said multiple tasks from said selected priority level to provide to said available instruction processor resource.

15. A method for use by a dispatcher in an operating system of a computer system for selecting one of multiple tasks to assign to an available instruction processor resource, said selected task being selected from one or more classes of tasks, each having one or more priority levels, wherein said method comprises:

if there is only one of said priority levels having any of said multiple tasks, assigning a first of said any of said multiple tasks to said available instruction processor resource, else, running a first lottery stage of a two-stage lottery algorithm to select one of said one or more classes, and running a second lottery stage of said two-stage lottery algorithm to select from said selected one of said classes a priority level from which to select said selected task to assign to said available instruction processor resource.

16. The method of claim 15 further comprising:
respectively associating each of said multiple tasks with an amount of time said each task is entitled to be assigned to said instruction processor resource;

placing each of said multiple tasks into any one of said priority levels based upon said associated amount of time; and moving said selected task from a current priority level to a different priority level based on how much of said associated amount of time said selected task used a last time said selected task was assigned to said available instruction processor resource.

17. The method of claim 16, said moving step further comprising:

if said selected task did not complete execution last time said selected task was assigned to said available resource, moving said selected task from said current priority level to a next lower priority level and increasing said associated amount of time by a predetermined amount, if said selected task used less than all, but more than a predetermined portion, of said associated amount of time last time said selected task was assigned to said available resource, leaving said priority level and said associated amount of time the same, and if said selected task used less than said predetermined portion of said associated amount of time last time said selected task was assigned to said available resource, moving said selected task from said current priority level to a next higher priority level and decreasing said associated amount of time by a predetermined amount.

18. The method of claim 16 wherein each of said multiple tasks is represented by a task pointer stored on a scheduler queue.

19. The method of claim 16 wherein said first stage lottery selects which of said classes of tasks has tasks assignable to said available instruction processor resource.

20. The method of claim 16, further comprising:
if any of said multiple tasks are in classes above a lottery line, providing said available instruction processor resource to said any of said multiple tasks in said classes above said lottery line in a predetermined priority order, and otherwise using said first stage lottery to select which of said classes of tasks have tasks assignable to said available instruction processor resource.

21. A dispatcher system for use within a computer system, said computer system having an instruction processor resource and a scheduler for storing pointers to tasks, each of said tasks to be assigned to said instruction processor resource for an amount of time associated with said each task, said dispatcher system comprising:

a first stage of a two stage lottery system for using a random number generator to select one of multiple classes of tasks; and a second stage of said two stage lottery system for selecting a task from said selected one of said multiple classes, whereby said selected task is assigned to said instruction processor resource for said amount of time associated with said selected task.

* * * * *